April 18, 1944.  P. G. ADAMS ET AL  2,347,016
DEMAND REGISTER
Filed May 20, 1941
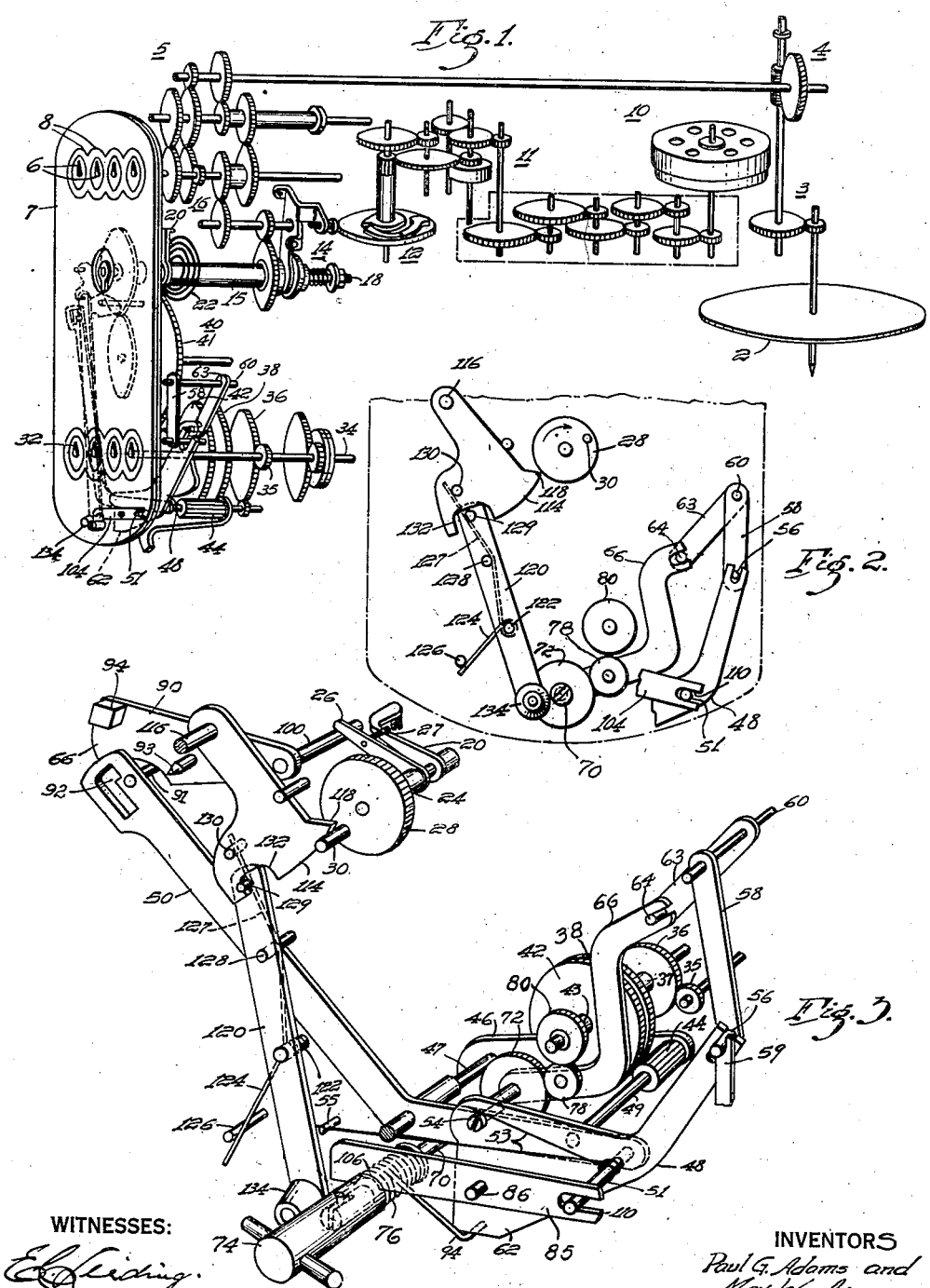
WITNESSES:
INVENTORS
Paul G. Adams and
Max W. Axman.
BY
ATTORNEY Patented Apr. 18, 1944

2,347,016

UNITED STATES PATENT OFFICE 2,347,016

DEMAND REGISTER

Paul G. Adams, Newark, and Max Walter Axman, Stirling, N. J., assignors to Westinghouse Electric & Manufacturing Company, East Pittsburgh, Pa., a corporation of Pennsylvania Application May 20, 1941, Serial No. 394,250

4 Claims. (Cl. 171—34)

The present invention relates to registers and it has particular relation to maximum demand type registers such as those having cumulative demand dials.

U. S. Patent No. 2,259,314 issued to Lewis et al. on October 19, 1941, relates to a register of this latter type. This register comprises a maximum demand indicator which is adapted to be driven to a position representing the maximum demand which has accrued on the instrument during a predetermined interval and also has integrating dials for registering the cumulative maximum demand. The latter dials are normally not connected to the meter and the maximum demand indicator. However, at the end of a billing period, the cumulative dials are coupled with the maximum demand indicator and the coupling mechanism is connected to the timing motor of the apparatus to drive the maximum demand indicator back to its zero position. Thus, the cumulative dials are advanced in proportion to the amount of reset movement which it is necesasry to transmit to the demand indicator and thereby present a lasting record of the maximum demand for the previous billing periods. At the end of the resetting operation the demand indicator and cumulative dials are automatically uncoupled from each other and from the reset motor.

With this apparatus just described, the reset motion is provided by a motor which may be the timing motor for the maximum demand indicator. In many cases, however, power companies prefer and demand a register which may be manually reset instead of one which places an additional load upon the timing motor. Such a manual reset device is disclosed in the present invention and also includes features which may be useful with the motor driven reset register described in the above-numbered patent. For example, a positioning latch is provided for insuring that the demand indicator is actually reset to its initial position and that it does not rebound therefrom upon contacting the stop device which is normally employed. Referring again to the manual reset feature, the invention provides apparatus which may be operated from a key which is normally not engaged therewith and may include means for automatically locking the key in engaged position once it is placed there to prevent its removal prior to the device being completely reset.

It is accordingly an object of the present invention to provide a novel and improved reset device for maximum demand type meters.

Another object of the invention is to provide an improved manually operated reset device for cumulative demand type watthour meter registers.

A further object of the invention is to provide a maximum demand meter including a reset device having means for preventing the indicator from rebounding from its zero position upon being reset thereto.

Still another object of the invention is to provide an improved maximum demand meter including a key controlled manually operable reset device comprising means for preventing removal of the key prior to the demand indicator being reset to its initial position.

Other objects and advantages of the invention will appear from the following detailed description read in conjunction with the accompanying drawing in which:

Figure 1 is an exploded perspective view of a cumulative type maximum demand meter register embodying the present invention;

Fig. 2 is an enlarged front view with parts broken away of a portion of the apparatus of Fig 1; and Fig. 3 is an enlarged exploded perspective view of a portion of the apparatus of Fig. 1.

The drawing shows the present invention applied to apparatus which is based primarily upon that disclosed in the aforementioned patent. Thus a disc 2 of an induction type watthour meter operates through a pinion and gear 3, worm wheel and worm gear 4, and gearing 5 to operate integrating pointers 6. These pointers may cooperate with dials 8 marked on a register face plate 7 in a usual manner. A timing motor 10 which may be of the inductor type operates through gearing designated generally as 11 to drive a clutch operating device 12. This device 12 operates the clutch 14 at periodic intervals, such as every thirty minutes, to release a sleeve 15 from gearing 16 which normally connects it to be driven in proportion to the speed of the meter disc 2. The sleeve 15 is disposed upon a shaft 18 and on its forward end is secured a pusher arm 20. A spiral spring 22 has one end secured to a stationary part of the register while its other end is connected to the sleeve 15 so as to bias the arm 20 in a counterclockwise direction as viewed from the front of Fig. 1. A second sleeve 24 is likewise disposed about the shaft 18 and has secured to one end thereof an arm 26 (Fig. 3) and includes a pin 27 extending inwardly for engagement with the top of the pusher arm 20 to be advanced thereby, To the other end of the sleeve 24 is fixed a maximum demand gear 28 having an indicating pin designated as 30.

It will appear that the above described apparatus will operate in the same manner as the apparatus of the previously mentioned patent so that the arm 20 will act to push the maximum demand arm 26 to a position which represents the maximum value of the demand which has accrued on the meter since the beginning of the billing period. In like manner the position of the gear 28 as shown by the pin 30 will be a true representation of the maximum demand which has accrued during a thirty minute interval since the indicator was last set to zero position.

The cumulative integrating dials are at the lower portion of the register face plate. The pointers of these dials are interconnected in a usual manner and the right-hand one is rotated by means of pinion 35 cooperating with a gear 36 which is mounted on a sleeve 37 rotatably mounted on shaft 34. A gear 38 is also mounted on said sleeve to rotate with the gear 36. The cumulative dial pointers are accordingly positively connected to the gear 38.

It is intended that the cumulative dials shall be connected to the demand mechanism only during the resetting operation at the end of the billing period. To this end, a gear 42 is mounted on a sleeve 43, to normally rotate independently of gear 38, and is driven from the demand gear 28 by means of a gear tain indicated generally as 40 in Fig. 1. Such gear train 40 has been omitted in Fig. 3 in the interest of simplification but a proper construction includes a large gear 41 (Fig. 1) which meshes with the demand gear 28 and a smaller gear driving the sleeve 43 upon which gear 42 is mounted. It is considered unnecessary to disclose this driving connection more specifically.

The gears 42 and 38 are coupled together when desired by means of a pinion 44 of sufficient length to engage both such gears at the same time. The pinion 44 is rotatably mounted on one end of a lever 46 which is pivotally mounted at its other end on a stationary shaft 47 secured to the register frame. The other end of pinion shaft 49 is secured to and carried by a lever 50 to which is pivotally secured a slotted lever 48 by means of a pin 51. The operating lever 50 is pivoted to stationary shaft 47.

A coil spring 53 has a mid-portion wound about pin 51, an upper arm secured to screw 54 carried by and extending through the slotted lever 48, and a lower arm engaging a stationary pin 55. The arrangement is such that the upper arm of the spring tends to rotate the slotted lever 48 in a counterclockwise direction until the extension of screw 54 engages the upper edge of lever 50, and the lower spring arm biases the operating lever 50 for rotation about its pivot 52 in a clockwise direction.

The slot in the end of lever 48 engages a pin 56 carried by the lower end of an arm 58. The pin 56 normally rests in a notch in a stop 59, carried by the register face-plate, to limit downward movement. The other end of arm 58 is secured to a shaft 60 which is pivotally mounted on bearings (not shown) in the register frame. Accordingly, force applied to the portion 62 of the slotted lever 48 to cause an upward movement of such portion will also move operating lever 50 in a counterclockwise direction about its pivot 47, and, as described later, it will be latched in such position. This will bring pinion 44 into mesh with the demand gear 42 and gear 38 which drives the cumulative dial pointers. At the same time the slotted end of lever 48 will initially move the lower end of arm 58 to the right, as viewed in Figs. 2 and 3, causing a counterclockwise rotation of shaft 60. However, when such force is released, the portion 62 of lever 48 will drop to a slightly higher position than it normally was, because the right-hand end of lever 50 is now higher, and shaft 60 rotates clockwise.

An arm 63 is also rigidly secured to shaft 60 and carries a pin 64 which rests in a notch in the end of a pivoted lever 66. The lever 66 is pivoted on a shaft 70 to which is secured a gear 72. The shaft 70 is rotatably mounted and is provided with a slotted end accessible from the front of the register to receive a key 74 for rotating it. Also on the shaft 70 is a coil spring 76 having a free end loosely engaging the portion 62 of the slotted lever 48, and the spring is so mounted on shaft 70 that upon counterclockwise rotation of the latter the free end of the spring will force said portion 62 upwardly, but when the shaft is turned clockwise, the spring will remain substantially in the position shown.

The lever 66 also has secured to it an idler gear 78 for connecting gear 72 in driving relation to a gear 80 secured to sleeve 43 upon which the demand gear 42 is mounted. The gear 78 is normally out of engagement with gear 80.

The operation of the cumulative registering mechanism thus far described is as follows:

The interval demand as indicated by the position of pin 30 on demand gear 28 is transmitted by suitable gearing from gear 28 to gear 42. Accordingly, the rotation of gear 42 is proportional to the maximum demand in any demand interval during the billing period.

The gear 38 is connected to drive the cumulative dial pointers.

At the end of the billing period, the meter reader uses a key 74 to engage the shaft 70 and first turns it counterclockwise a small amount. This raises the left end of slotted lever 48 and permits the left end of lever 50 to drop to a latched position, as later described. Pinion 44 is thereby brought into engagement with gears 38 and 42 to couple them together. The meter reader then rotates key 74 in a clockwise direction whereupon lever 48, in dropping, operates the arms 58, 62, 64 and lever 66 to bring gear 78 into mesh with the gears 72 and 80.

Continued clockwise turning of the key resets the demand indicator 28, 30 back to zero by reason of the turning of gear 42, and during this operation gear 38 will be turned the same amount as gear 42. Gear 38 being connected to the cumulative dial pointers, these will be advanced according to the amount of resetting movement, and pinion 44 drops out automatically at the zero position of the demand indicator, as later described.

It is usually desirable to insure that the reset key 74 be rotated a complete revolution in the resetting direction. This may be accomplished by providing a bar 85 pivoted at 86 and provided with a slotted end embracing an extension of pin 51 which pivotally connects levers 48 and 50. The key 74 is grooved circumferentially at its inner end and bar 85 is notched to fit into said groove. Normally the bar is above the key position, but when the resetting operation is initiated by raising portion 62 of lever 48, the notch in bar 85 drops into the groove and stays there until pin 51 drops upon completion of the resetting operation to raise the notched portion of the bar.

The left-hand end of lever 50 is, as described in said Patent 2,259,314, provided with a pocket for receiving the tip of a latching lever, so that counterclockwise movement of lever 50 brings the pocket under the tip of the latching lever and lever 50 is retained in such position. The pocket may conveniently be provided by a pin 91 and a lug formed by partially punching out a lug 92 and bending it at right angles to lie parallel to but spaced from the pin 91. The latching lever 90 is pivoted at 93 and biased by a weight 94 to bring the latching tip into such pocket. The other end of the lever is provided with an arm 100 which is in the path of the demand indicator arm 26 to be engaged thereby when the demand indicator is reset to its zero position by the operation of key 74 and gear 42. Upon such engagement, lever 90 will be rotated clockwise to release its tip from the pocket, thereby permitting lever 50 to move clockwise and break the engagement between pinion 42 and gears 38 and 42.

Other features of the invention include a positioning latch 114 which is pivotally secured to a stationary portion of the register at 116. This positioning latch includes a cam shaped portion having a cam surface 118 and is normally maintained in a position adjacent to the path of movement of the maximum demand indicating pin 30. The location of this positioning latch is controlled through a lever 120 which is pivotally secured to a stationary part of the apparatus as at 122. A spring 124 is disposed about this positioning pin 122 and includes a lower arm engaging a stationary stud 126 and an upper arm 127 engaging studs 128 and 129 carried by the lever itself. In addition this upper arm 127 engages a stud 130 carried by the positioning latch. The lower portion of the spring thus biases the lever 120 in a counterclockwise direction while its upper portion, acting through the stud 129 which fits within a notch 132 in the positioning latch, provides a resilient control arrangement for the latch.

At the lower end of the lever 120, at a position closely adjacent to the outer end of the shaft 70 is disposed a conical cam member 134. Thus while the lever 120 is normally biased toward a position with its lower end in engagement with or close to the end of this shaft 70, the key 74 upon being placed in position engages the conical cam 134 to displace it in a clockwise direction. This movement of the lever 120 in turn moves the latch 114 to place the cam portion 118 in the path of the maximum demand indicator pin 30. During the resetting operation the pin 30 is thus moved in a counterclockwise direction and just before reaching its initial position will come into engagement with the cam surface 118. Since the latch is resiliently mounted, the reset movement of the pin 30 will act against the spring arm 127 to force it out of the path. Immediately upon the pin passing the position of the latch, however, the spring will force it back into position so that its lower surface will prevent any movement of the pin 30 past it in the opposite direction.

The positioning latch is preferably disposed so that its cam portion moves to a position adjacent to the zero or initial position of the pin 30 so that any tendency of the pin to rebound from its initial position will be barred in the manner previously described. It will also be clear that the positioning latch will be maintained in this operative position so long as the key 74 is in engagement with the shaft 70. Since the key is locked in position until the completion of the reset operation by means previously described the device will absolutely insure a correct resetting.

It is believed that the advantages and operation of the invention will be evident from the foregoing description. The invention thus not only provides a most satisfactory improved manually operable reset device for a maximum demand meter but has features which may be applied with advantage to motor driven reset devices as well.

Since various modifications of the specific apparatus shown and described may be made by those skilled in the art, it is intended that the invention shall be limited only by the appended claims interpreted in view of the prior art.

We claim as our invention:

1. In an electrical meter including a member displaceable from a predetermined position in accordance with the maximum demand thereon and a cumulative demand registering device, means for selectively coupling said registering device with said member, means for resetting said member to said predetermined position while coupled with said device, means disposed in the path of said member adjacent its said predetermined position during the resetting operation to prevent its rebounding from said predetermined position upon being reset thereto, means for automatically uncoupling said member and said registering device at the completion of the resetting operation, and means for maintaining said rebound preventing means out of the path of said member between resetting operations.

2. In an electric meter including a member displaceable from a predetermined position against a stop device in accordance with the maximum demand thereon, a mechanism for resetting said member to said predetermined position, a positioning cam having a cam surface and another surface in oblique relationship, said cam being normally out of the path of said demand member, and means for resiliently disposing said cam in the path of said demand member adjacent its said predetermined position during said resetting operation with said cam surface oblique to the path of said member so as to be engaged and pushed aside thereby on its movement to said predetermined position and with said other surface so disposed as to prevent movement of the member away from said position.

3. In an electric metering device including a maximum demand indicator and a cumulative demand registering device normally uncoupled therewith, means operable to couple said indicator and said cumulative registering device, a reset control member connectable to said metering device for operating said coupling means and manually movable after said coupling operation to reset said indicator to a predetermined starting position while said coupling means are in operative condition, means responsive to the operation of said coupling means by said control member for locking said control member against disconnection from said device until said indicator is returned to said starting position, and means for disconnecting said coupling means at the completion of the resetting operation.

4. In an electric meter including a member displaceable from a predetermined position in accordance with the maximum demand and a cumulative demand registering device normally uncoupled therewith, means operable for coupling said demand member and said registering device, a reset control member engageable with said meter for actuating said coupling means and resetting said demand member toward said predetermined position while coupled with said registering device, means disposed in the path of said member adjacent its said predetermined position during the resetting operation to prevent its rebounding from said predetermined position upon being reset thereto, means operable by said control member prior to commencement of the resetting movement of said demand member for locking said control member against disconnection from said device until said demand member is returned to said starting position, and means for disconnecting said coupling means at the completion of the resetting operation.

PAUL G. ADAMS.
MAX WALTER AXMAN.